June 7, 1938.   E. C. HORTON ET AL   2,119,510
MOTOR VEHICLE ACCESSORY SYSTEM
Filed June 23, 1932   2 Sheets-Sheet 1
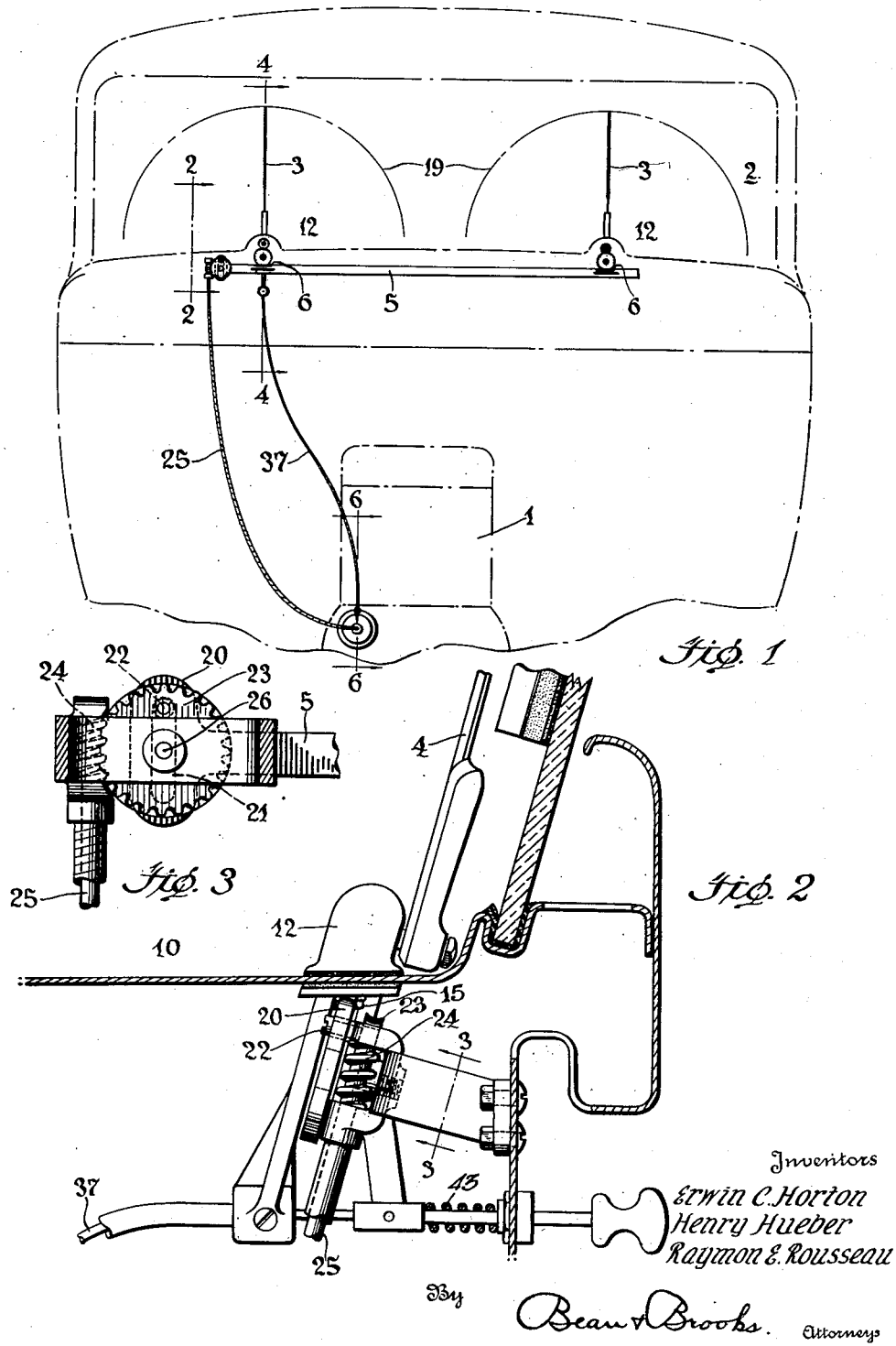

June 7, 1938.  E. C. HORTON ET AL  2,119,510
MOTOR VEHICLE ACCESSORY SYSTEM
Filed June 23, 1932   2 Sheets-Sheet 2
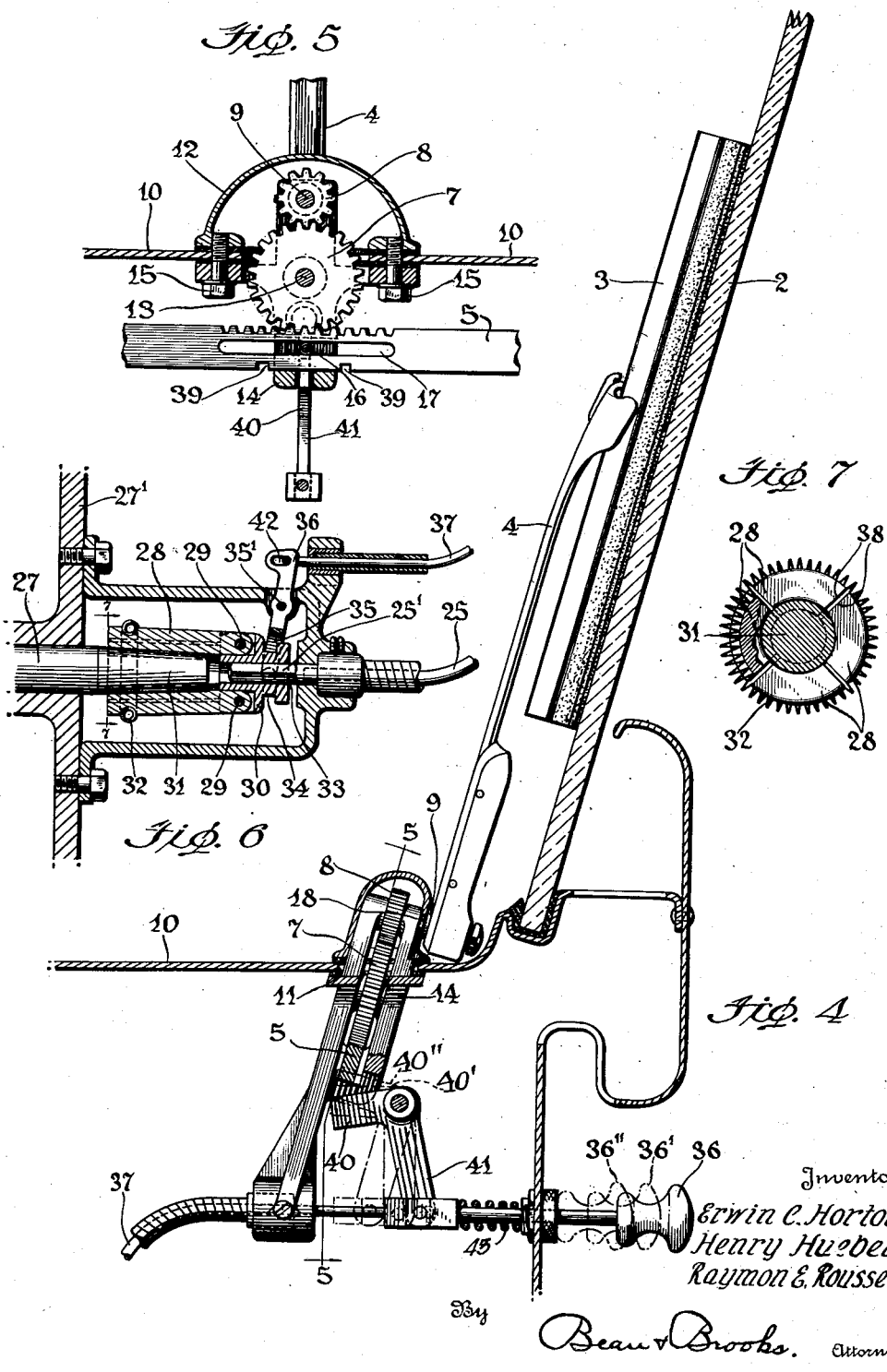

Patented June 7, 1938

2,119,510

UNITED STATES PATENT OFFICE 2,119,510

MOTOR VEHICLE ACCESSORY SYSTEM

Erwin C. Horton, Hamburg, and Henry Hueber and Raymon E. Rousseau, Buffalo, N. Y., assignors to Trico Products Corporation, Buffalo, N. Y.

Application June 23, 1932, Serial No. 618,992

24 Claims. (Cl. 15—255)

This invention relates to the motor vehicle art and particularly to an accessory system thereof.

Heretofore windshield cleaners have been primarily operated by fluid pressure or so called suction operated motors. The suction or low pressure utilized for the operation of the windshield cleaner has been derived from the pressure influences in the intake manifold of the engine. This source of suction varies between wide limits according to the position of the engine throttle and at times the desired suction is not available for maintaining the efficient operation of the windshield cleaner.

The present invention has for its object to provide a windshield cleaner mechanism incorporated in the vehicle body construction in a permanent manner and so coupled with a shaft of the motor vehicle engine, or other shaft, as a drive, whereby a substantially uniform movement of the wiper element on the windshield is insured. Further the invention resides in a windshield cleaner mechanism embodying means for deriving its power from a rotating shaft of the motor vehicle in a positive manner but enabling the parking of the wiper element when the latter is rendered inoperative.

In the drawings:

Fig. 1 is a diagrammatic illustration of the windshield mechanism coupled to a shaft of the motor vehicle engine.

Fig. 2 is a detailed showing through that portion of the cleaner mechanism which is disposed adjacent the windshield, the view being taken about on line 2—2 of Fig. 1.

Fig. 3 is a fragmentary view of said portion as taken on line 3—3 of Fig. 2.

Fig. 4 is a view similar to Fig. 2 but taken about on line 4—4 of Fig. 1, further illustrating the construction.

Fig. 5 is a further detail showing of the windshield cleaner mechanism taken about on line 5—5 of Fig. 4.

Fig. 6 is a sectional view of a form of speed governor for the windshield cleaner mechanism this view being taken about on line 6—6 of Fig. 1.

Fig. 7 is a sectional view therethrough about on line 7—7 of Fig. 6, parts being broken away.

Referring more particularly to the accompanying drawings, the numeral 1 designates the motor vehicle engine, 2 the windshield, 3 the wiper blades or elements, and 4 the wiper arms for moving the wiper elements back and forth over the windshield. From the base of the windshield extends the body portion referred to hereinafter as the cowl which term for the purposes of this disclosure and in the terminology of the claims is inclusive of the engine hood.

In the particular showing a plurality of wiper elements 3 have been illustrated and these are coupled together for synchronized movements. This coupling drive or transmission is depicted as comprising a power bar 5 having spaced rack portions 6 meshing with the pinions 7, the latter being in turn associated with pinions 8 fixed to the wiper actuating shafts 9 to which the arms 4 are connected. The portion 10 of the body which extends forwardly from the windshield glass, and herein referred to as the cowl, is provided with spaced openings 11 through which the transmission from the power bar 5 to the wiper shaft 9 extends its movement. A hood or housing 12 caps each opening 11 so as to weatherproof the same and protect the transmission. A shaft 13 is provided for mounting each gear 7, and to facilitate the mounting of each transmission on the cowl or body structure a frame 14 is provided, the same being shown secured to the cowl as by attaching screws 15. These screws may also serve to connect the housings 12 to the cowl in constructions wherein the housings are made separately from the cowl, as herein shown. The power bar 5 may be conveniently supported for reciprocatory movement in the frames 14 as by having roller bearings 16 operating in guideways 17. Each wiper actuating shaft 9 is extended through an opening 18 in the wall of its housing 12 to receive the arm 4, the shaft preferably extending at a normal to the plane of the windshield glass, and to this end the transmission may be supported in parallellism with the windshield glass. It follows from the foregoing that reciprocation of the power bar 5 will impart oscillatory movement to the wiper elements 3 to clean fan-shaped areas on the windshield, as indicated by the broken lines 19, Fig. 1.

Means are provided for reciprocating the power bar and in the simple embodiment herein illustrated this means comprises a cross arm 20 connected to the power bar 5 and provided with a slot 21 in which rides a crank pin 22 extending from the side face of a gear wheel 23. This gear wheel is shown meshed with a worm 24 connected to a flexible shaft 25 so that as the shaft is rotated the worm will drive the gear wheel 23 about its axis 26 and cause the crank pin 22 to move the power bar back and forth. The shaft 25 is coupled to a drive shaft 27 so as to be driven thereby, this shaft being preferably in the motor vehicle engine 1, such as the crank shaft or, as illustrated, the cam shaft extension through the crank case 27', whereby power may be derived for operating the windshield cleaner mechanism while the car is standing still and without placing any additional load of a substantial size on the engine.

In certain engine operations, such as when shifting gears, or traveling at a very high rate of speed, the drive shaft 27 will likewise be driven at a high rotative speed, the speed fluctuating with the speed of the engine, and therefore to avoid transmitting a fluctuating and excessive speed to the windshield cleaner mechanism which would impart irregular actuation or movement to the wiper elements 3, means are provided for determining or controlling the transmitted power.

By way of illustration, a simple control or governing device has been illustrated in Figs. 6 and 7 wherein means are provided which respond to a predetermined speed in the driven shaft 25 for relieving the wiper mechanism from further increase in speed and thereby functions to maintain a constant speed in said driven shaft. In the embodiment illustrated in Fig. 6 a plurality of clutch elements 28 are mounted to rotate with the driven or flexible shaft 25 and are in turn mounted to swing outwardly under centrifugal force about pivots 29 to which the elements 28 are pivoted on a collar 30. The clutch elements 28 are designed to embrace a cone 31 which is connected to the drive shaft 27, said clutch elements 28 being normally urged into gripping contact with the cone 31 by resilient means, such as the encircling and expansible spring ring 32, of a predetermined tension whereby when the R. P. M. of the driven shaft exceeds a predetermined normal the clutch will expand and slip on the cone to maintain the desired speed of wiper operation. Thus excessive rotation of the of the shaft 27 will cause the weighted clutch elements 28 to swing outwardly against the tension of the expansible ring 32 and thereby uncouple the drive shaft 27 from the flexible shaft 25.

As a means of rendering the wiper elements inoperative, the windshield cleaner mechanism may be uncoupled from the drive, such as by removing the clutch 28 from the cone 31. This may be accomplished by splining the clutch collar 30 on the end 25' of the flexible shaft, as indicated at 33 in Fig. 6. For this purpose the collar 30 may be provided with an annular groove 34 in which rides a yoke 35 the latter being rockable on its pivot 35' by means of an accessible control or handle 36 to which it is connected, as through a Bowden wire 37. The clutch elements 28 will be held against following embrace with the cone, during the declutching shifting operation, by the stop shoulders 38 abutting one another to limit the contractive relationship of said elements.

Means are provided in the mechanism for parking the wiper elements when their operation is not desired. For this purpose a pair of notches 39 may be provided in the power bar 5 into which may drop a latch 40 so as to arrest the windshield cleaner mechanism at a selected one of the limits of movement of the wiper elements. To insure proper disconnection of the cleaner mechanism from its source of power, the control 36 is connected to the latch 40, as by means of the arm 41 so that as the control is pushed inwardly to disconnect the power drive, the latch 40 will engage the bar 5 and ride thereon until one of the notches 39 presents itself to the latch. This riding position of the latch is indicated by the broken line showing 40' (Fig. 4), at which time the control 36 will be at position 36'. Up to this time the wiper mechanism remains in operative clutched relation with the drive shaft 27 by reason of a play connection 42 between the Bowden wire 37 and the yoke 35, as shown in Fig. 6. As soon as the notch 39 comes opposite the latch 40 the latter will drop therein under the urge of a spring 43 which moves the latch to position 40" and the control to position 36", and at the same time disengage the clutch 28 from the cone 31.

Pulling the knob 36 out to the full line position, Fig. 4, will withdraw the latch 40 from its engaged notch 39 and bring the clutch 28 and cone 31 into driving relation.

It is obvious, therefore, that if the drive shaft 27 exceeds a predetermined speed the clutch 28 will expand under centrifugal force to disengage the driving cone. Since the clutch parts 28 are carried by the driven element they will merely slip upon the cone 31 sufficiently to maintain the driven shaft at the desired and predetermined speed while permitting the driving shaft to continue moving at an excessive speed. When it is desired to discontinue the use of the cleaner the wiping elements will be automatically parked to one side or the other of the cleared zone or area on the windshield.

What is claimed is:

1. In a motor vehicle structure having a windshield, a drive shaft, a windshield cleaner having an actuating shaft for operating it, transmission mechanism operatively connecting the drive shaft to the actuating shaft for transmitting power to the windshield cleaner, means having connection to said transmission mechanism for rendering said actuating shaft inoperative, means coacting with said mechanism for parking portions of the windshield cleaner in a predetermined position, and a device having connections to both of said means to operate them concurrently.

2. In a motor vehicle structure having a windshield, an engine operated variable speed drive shaft, a windshield cleaner having an actuating shaft for operating it, mechanism operatively connecting the driving shaft to the actuating shaft for transmitting power to the windshield cleaner, a device included in said mechanism and responsive to the speed of the actuating shaft for regulating the rate of operation of the windshield cleaner, means having connection to said mechanism operative to disconnect the cleaner from the variable speed driving shaft, and means interposed between the speed responsive device and the cleaner and coacting with the first mentioned means to arrest portions of the windshield cleaner in a predetermined position simultaneous with the disconnection of the cleaner by said first means.

3. A clutch for controlling the speed of wiper operation in windshield cleaners, comprising a rotatable drive member and means releasably engaging said drive member, said means including clutch parts engaging said drive member and movable therefrom in response to centrifugal force, said clutch parts having peripheral seats, resilient means encircling said parts and engaged in said peripheral seats for urging clutching engagement with said drive member.

4. In a motor vehicle construction having a windshield, a cleaner movable on the windshield to clean the same, a drive member, a driven member operated by the drive member, means operatively connecting the driven member to the cleaner for operating the same, means for operatively disconnecting the driven member from the drive member, and means connected to the second means and operable by and during operation of said second means for holding the cleaner in a parked position.

5. In a motor vehicle construction having a windshield, a cleaner movable on the windshield to clean the same, a rotatable drive member, a rotatable driven member operatively connected to the cleaner for operating the same, a clutch for connecting said driven member to said drive member, means for rendering said clutch inoperative, means for positively locking the cleaner in a parked position when said clutch is inoperative, and means to coordinate the first and second means for parking the cleaner.

6. A windshield cleaner comprising a drive member, a driven member operated thereby, means mounting the driven member for movement into and out of operative relation to said drive member, a windshield wiper, an actuator for operating the wiper and itself operatively connected to the driven member for being driven thereby, said actuator having a notch, a latch engageable in the actuator notch to arrest the wiper in a predetermined position, and means for simultaneously moving the driven member out of operative relation to said drive member and said latch into the actuator notch.

7. In a motor vehicle structure having a windshield, a drive shaft, a windshield cleaner having an actuating shaft for operating it, means operatively connecting the drive shaft to the actuating shaft for transmitting power to the windshield cleaner, mechanism for disconnecting the drive shaft from said actuating shaft for rendering the latter inoperative, said mechanism being operatively connected to said connecting means and means coacting with said mechanism and the cleaner operating means for rendering the mechanism inoperative until portions of the windshield cleaner reach a predetermined position.

8. In combination, a source of power, a rotatable shaft driven thereby, a cleaner mounted for movement, a member driven by said shaft and operatively connected to said cleaner, means manually movable into arresting engagement with said driven member for effecting an arrest of the cleaner in a parked position, and parts operatively connected to said manual means and movable thereby to disconnect said rotatable shaft from its source of power.

9. In a motor vehicle structure having a windshield, a windshield cleaner having an actuating shaft mounted in the vehicle structure, a drive shaft included in the vehicle structure, means operatively connecting the cleaner actuating shaft to the drive shaft, said means including mechanism responsive to the speed of the cleaner actuating shaft for maintaining a substantially constant speed of the latter when the drive shaft speed is increased above a predetermined value, means operable for dissociating the drive shaft from the actuating shaft, and means engageable with a part of the connecting means at the cleaner side of the mechanism for positively arresting the cleaner.

10. A windshield cleaner for a motor vehicle having a body portion provided with an opening, a supporting structure mounted in the opening and having a part extending forwardly of the windshield, a wiper shaft journalled in the supporting structure part substantially at a normal to the windshield, a pinion fixed on the shaft and disposed above the body portion of the vehicle, a source of power beneath said body portion, transmission means operatively connecting said source and said pinion through the body opening and embodying a member movable beneath said body portion, and means supported by the supporting structure beneath said body portion for mechanically engaging and arresting said movable member for effecting a parking of the wiper to one side of the area cleaned by the wiper.

11. A windshield cleaner having a wiper, a drive member, transmission means operatively connecting the drive member to the wiper for moving the latter back and forth on the windshield, a part movable with the transmission means in a definite path, means included in the transmission means and operable for interrupting the transmission of power through said transmission means, and means operatively connected to said interrupting means and movable when said part is in a predetermined position to render the interrupting means operative.

12. In a motor vehicle construction having a windshield, a cleaner movable on the windshield to clean the same, a drive member, a driven member operated by the drive member, means operatively connecting the driven member to the cleaner for operating the latter, means for disconnecting the driven member from the drive member, and spring actuated means connected to the second means and releasable by and during operation of the first means for operating said second means to arrest the cleaner.

13. In a motor vehicle structure having a windshield, a drive shaft, a windshield cleaner having an actuating shaft for operating it, means operatively connecting the drive shaft to the actuating shaft for transmitting power to the windshield cleaner, spring actuated mechanism for disconnecting the drive shaft from said actuating shaft for rendering the latter inoperative, said mechanism being operatively connected to said connecting means, and means coacting with said mechanism and the cleaner operating means for rendering the mechanism inoperative until portions of the windshield cleaner reach a predetermined position.

14. In combination, a source of power, a rotatable shaft driven thereby, a cleaner actuated by said shaft, a member driven by said shaft, means manually movable into positive engagement with said driven member when the latter is in a predetermined position, and parts movable in response to said first movement to disconnect said rotatable shaft from its source of power.

15. In a motor vehicle structure having a windshield, a windshield cleaner having a wiper and a wiper actuating shaft mounted in the vehicle structure, a drive shaft included in the vehicle structure, means operatively connecting the wiper actuating shaft to the drive shaft and including separable clutch parts, means connected to one of the clutch parts and operable to separate said parts for dissociating the drive shaft from the actuating shaft, and means operatively connected to said dissociating means and operable by and during operation of said dissociating means for parking the wiper, said parking means engageable with a moving part of said connecting means for timing the parking of the wiper to come to rest at one side of the cleaned windshield area.

16. A windshield cleaner having a wiper, a drive member, transmission means operatively connecting the drive member to the wiper for moving the latter back and forth on the windshield and including means operable to disconnect the wiper from the drive member, a part movable with the transmission means in a definite path, and means connected to said disconnecting means and engageable with said part when the latter is in a predetermined position to arrest the wiper, said arresting means being normally disposed without the path of said part.

17. In a motor vehicle structure having a windshield, a windshield cleaner having a wiper oscillating shaft mounted in the vehicle structure, a drive shaft included in the vehicle structure and operable at varying speeds incidental to vehicle manipulation, means operatively connecting the wiper shaft to the drive shaft and including a speed responsive governor for maintaining a substantially constant speed of the wiper shaft when the drive shaft speed is increased above a predetermined value, means operable for dissociating the drive shaft from the wiper shaft, and means engageable with a moving part of the cleaner at the wiper side of the governor for positively arresting the wiper in a parked position.

18. A windshield cleaner comprising a windshield wiper having an actuating shaft, power operated means operatively connected to said shaft for oscillating the same and having a reciprocable part, means for cutting off the power to said power operated means, means engageable with the reciprocable part of the cleaner for retaining said windshield wiper in a predetermined position, and a device having connection to both the power cut-off means and the retaining means to operate them concurrently.

19. A windshield cleaner for motor vehicles comprising a power source available while the motor vehicle engine is in operation and energized thereby, a wiper member adapted to be moved upon a windshield glass to clean the same, a rock shaft connected to said wiper to operate the same, transmission means operatively connecting said shaft to said power source, means for operatively disconnecting said power source from said transmission, means for mechanically locking said rock shaft and said wiper in a predetermined parked position, and a device having connection to both said disconnecting means and said locking means to operate them concurrently irrespective of the continuation of operation of said vehicle engine.

20. A windshield cleaner comprising a wiping member, means for operating said wiping member and including a shaft supporting the same for oscillatory movement, a latch movably mounted adjacent said operating means, the latter having a part movable back and forth with the wiping member and provided with a notch and a surface leading to the notch, said part being movable to and away from a position in which the notch is in alignment with respect to said latch during normal oscillation of the wiping member, and control means for manually pre-setting said latch on such surface for subsequent entry into said notch when the latter reaches said position of alignment, said surface being substantially coextensive with the movement of said part for supporting said pre-set latch when the notch is out of alignment with the latter.

21. In a windshield cleaner comprising a power source, a wiping member, and transmission means for operatively connecting said wiping member to said power source for oscillating said wiping member about a pivot point; locking means for positively arresting said wiping member, said transmission means having a part connected for movement with said wiping member and having a notch engageable by said locking means to arrest operation of the wiping member in a predetermined position of its movement, said locking means including a spring pressed latch member adapted to ride against said part until said predetermined position is reached through alignment of the latch member with the notch in said part, and power interrupting means rendered operable by the engagement of said locking means with said part.

22. In an automotive vehicle having a power plant and a windshield cleaner, means for transmitting power from the power plant to the windshield cleaner for operating the latter, means for engaging a moving part of said power transmitting means for holding the latter in one position, means for interrupting the power transmitting means, means for operating the engaging means, and means for coordinating the last two mentioned means whereby the interrupting means may become effective only upon operation of said engaging means.

23. An accessory system for motor vehicles having a source of power, a power actuated accessory, an energy translating device for delivering energy from the source of power in form suitable for said power actuated accessory, energy transmitting means from said translating device to said power actuated accessory, a control device for bringing said actuated accessory to rest in a predetermined position when the power supply is interrupted, and means cooperatively related with said control device to discontinue the transmission of power through said translating device substantially concurrent with the functioning of the control device.

24. In a motor vehicle construction having a windshield, a cleaner movable on the windshield to clean the same, drive means, driven means operated by the drive means, means operable by the driven means for actuating the cleaner, means for operatively disconnecting the driven means from the drive means, means for parking the cleaner in a parked position, and means coordinating the disconnecting means and the parking means for substantially concurrent actuation.

ERWIN C. HORTON.
HENRY HUEBER.
RAYMON E. ROUSSEAU.